(12) United States Patent
Hayakawa

(10) Patent No.: US 8,249,430 B2
(45) Date of Patent: Aug. 21, 2012

(54) DIGITAL BROADCAST RECEIVING APPARATUS AND METHOD FOR DISPLAYING IMAGES WITH PROGRAMMING INFORMATION

(75) Inventor: Takeshi Hayakawa, Osaka (JP)

(73) Assignee: Panasonic Corporation, Osaka (JP)

( * ) Notice: Subject to any disclaimer, the term of this patent is extended or adjusted under 35 U.S.C. 154(b) by 964 days.

(21) Appl. No.: 12/298,395

(22) PCT Filed: Apr. 17, 2008

(86) PCT No.: PCT/JP2008/001004
§ 371 (c)(1),
(2), (4) Date: Oct. 24, 2008

(87) PCT Pub. No.: WO2008/129879
PCT Pub. Date: Oct. 30, 2008

(65) Prior Publication Data
US 2009/0175593 A1    Jul. 9, 2009

(30) Foreign Application Priority Data

Apr. 18, 2007 (JP) .................................. 2007-108891

(51) Int. Cl.
*H04N 5/76* (2006.01)
(52) U.S. Cl. .............. 386/296; 386/297; 725/40; 725/46
(58) Field of Classification Search .................. 386/291, 386/297; 725/40, 44
See application file for complete search history.

(56) References Cited

U.S. PATENT DOCUMENTS

| | | | | |
|---|---|---|---|---|
| 5,790,202 A | * | 8/1998 | Kummer et al. | 348/553 |
| 6,023,241 A | * | 2/2000 | Clapper | 342/357.32 |
| 6,130,720 A | * | 10/2000 | Naimpally | 348/553 |
| 6,177,931 B1 | * | 1/2001 | Alexander et al. | 725/52 |
| 6,507,371 B1 | * | 1/2003 | Hashimoto et al. | 348/552 |
| 6,604,049 B2 | * | 8/2003 | Yokota | 701/484 |
| 6,819,268 B2 | * | 11/2004 | Wakamatsu et al. | 340/988 |
| 6,879,284 B2 | * | 4/2005 | Dufek | 342/357.34 |
| 7,421,725 B2 | * | 9/2008 | Hane et al. | 725/46 |
| 7,535,492 B2 | * | 5/2009 | Kahn et al. | 348/211.1 |
| 7,584,492 B2 | * | 9/2009 | Terakado et al. | 725/53 |
| 7,593,033 B2 | * | 9/2009 | Walker et al. | 348/142 |

(Continued)

FOREIGN PATENT DOCUMENTS

| | | | |
|---|---|---|---|
| JP | 4-347977 | * | 12/1992 |
| JP | 11-284939 | * | 10/1999 |
| JP | 2001-223960 A | | 8/2001 |
| JP | 2001223960 A | | 8/2001 |
| JP | 2002-168632 | * | 6/2002 |

(Continued)

OTHER PUBLICATIONS

Kozuki, Machine generated translation of JP 2006-238192, Sep. 2006.*

*Primary Examiner* — David Harvey
(74) *Attorney, Agent, or Firm* — RatnerPrestia

(57) ABSTRACT

The present invention provides a digital broadcast receiving apparatus and a digital broadcast receiving method for retrieving a favorite program based on places where a user frequently visits and showing a program related to the places where the user frequently visits. In the digital broadcast receiving apparatus and the digital broadcast receiving method, based on GPS information included in a still picture captured by a digital camera and position information included in EPG information, whether a program is related to a favorite place of the user or not is determined, and the program related to a favorite place of the user is provided as a recommended program to the user.

10 Claims, 11 Drawing Sheets

U.S. PATENT DOCUMENTS

| | | | |
|---|---|---|---|
| 7,707,283 B2 * | 4/2010 | Tsunoda et al. | 709/224 |
| 7,778,438 B2 * | 8/2010 | Malone | 382/100 |
| 7,872,669 B2 * | 1/2011 | Darrell et al. | 348/207.1 |
| 7,974,511 B2 * | 7/2011 | Mikawa | 386/200 |
| 2001/0024565 A1 | 9/2001 | Yui | |
| 2002/0016964 A1 | 2/2002 | Aratani et al. | |
| 2004/0218895 A1 * | 11/2004 | Samadani et al. | 386/46 |
| 2005/0162533 A1 * | 7/2005 | Noguchi et al. | 348/239 |
| 2007/0039023 A1 * | 2/2007 | Kataoka | 725/46 |
| 2008/0228689 A1 * | 9/2008 | Tewary et al. | 706/48 |
| 2008/0244655 A1 * | 10/2008 | Mattila et al. | 725/46 |
| 2008/0288551 A1 * | 11/2008 | Van De Sluis | 707/200 |

FOREIGN PATENT DOCUMENTS

| | | | |
|---|---|---|---|
| JP | 2002-262245 A | | 9/2002 |
| JP | 2003016078 A | | 1/2003 |
| JP | 2003-051997 | * | 2/2003 |
| JP | 2004-62428 A | | 2/2004 |
| JP | 2004062428 A | | 2/2004 |
| JP | 2006-229867 A | | 8/2006 |
| JP | 2006-238192 | * | 9/2006 |
| JP | 2006-238192 A | | 9/2006 |
| WO | WO 2007/063463 | * | 6/2007 |

* cited by examiner

FIG. 4

| 401 | 402 | 403 | 404 | | | | 405 | 406 |
|---|---|---|---|---|---|---|---|---|
| | | | Additional information | | | | | |
| Number | File name | Selection state flag | Date | Latitude | Longitude | Altitude | Pointer to thumbnail image data | Pointer to main image data |
| 1 | ○○○ | 0 | | | | | SP_1 | MP_1 |
| 2 | XXX | 1 | | | | | SP_2 | MP_2 |
| ...... | ...... | ...... | | | | | ...... | ...... |
| N | △△△ | 0 | | | | | SP_N | MP_N |

| Number | File name | Selection state flag | Additional information | | | Pointer to thumbnail image data | Pointer to main image data |
|---|---|---|---|---|---|---|---|
| | | | Date | Latitude | Longitude | Altitude | | |

| Number | File name | Selection state flag | Date | Latitude | Longitude | Altitude | Pointer to thumbnail image data | Pointer to main image data |
|---|---|---|---|---|---|---|---|---|
| 1 | OOO | 0 | | | | | SP_1 | MP_1 |
| 2 | XXX | 1 | | | | | SP_2 | MP_2 |
| ...... | ...... | ...... | | | | | ...... | ...... |
| N | △△△ | 0 | | | | | SP_N | MP_N |

| Event ID (601) | Start time (602) | Duration of program (603) | Program name (604) | Program outline (605) | Position information (606) | | | Accumulation point (607) |
|---|---|---|---|---|---|---|---|---|
| | | | | | Latitude | Longitude | Altitude | |
| 1 | 7:00 | 2h30m | | | | | | |
| 2 | 9:30 | 30m | | | | | | |
| ……… | ……… | ……… | | | | | | |
| N | | | | | | | | |

600

DIGITAL BROADCAST RECEIVING APPARATUS AND METHOD FOR DISPLAYING IMAGES WITH PROGRAMMING INFORMATION This application is a U.S. National Phase Application of PCT International Application PCT/JP2008/001004.

TECHNICAL FIELD

The present invention relates to a digital broadcast receiving apparatus and a digital broadcast receiving method for presenting a program related to a place where a user often visits, based on position information included in a still picture file and position information included in each program.

BACKGROUND ART

One of conventional television broadcast receiving apparatuses is a television broadcast receiving apparatus having a function of selecting content to be presented to a television broadcast receiving apparatus from a plurality of pieces of broadcast data based on position information of the television broadcast receiving apparatus measured by a GPS. Such a television broadcast receiving apparatus is disclosed in, for example, Patent Document 1.

There is a known image processing apparatus. In a case where a result of analysis of GPS information in a still picture file captured by a digital camera coincides with position data obtained from digital broadcast program data, the apparatus also stores a thumbnail image when recording a program. The thumbnail image of the digital camera is displayed in a play list displayed when reproducing the recorded program. Such an image processing apparatus is disclosed in, for example, Patent Document 2.

However, the technique of Patent Document 1 is directed to a portable television broadcast receiving apparatus on which a GPS system is mounted. Since a program is selected based on a present position of the user, in a case of a television broadcast receiving apparatus expected to move such as a mobile device, information of a present place can be obtained. However, in a case of a stationary television broadcast receiving apparatus for household use, a program related to a favorite place of the user cannot always be provided.

In Patent Document 2, when recording a program, information related to digital broadcast program data and a thumbnail image can be stored so as to be associated with each other. Generally, still pictures captured by a digital camera, which are reproduced by a digital broadcast receiving apparatus are often taken in places where the user visited for leisure. Therefore, places where pictures are often taken are places the user frequently visits and are considered as favorite places of the user. It cannot be said that GPS information in a still picture file is effectively used.

[Patent Document 1] Unexamined Japanese Patent Publication No. 2006-229867
[Patent Document 2] Unexamined Japanese Patent Publication No. 2006-238192

DISCLOSURE OF THE INVENTION

The present invention provides a digital broadcast receiving apparatus and a digital broadcast receiving method for presenting, as a recommended program, a program related to a favorite place of a user based on GPS information included in a still picture and position information included in EPG information.

A digital broadcast receiving apparatus includes: a medium inserting unit for inserting a recording medium on which position information is recorded together with image information; a medium control unit for obtaining the image information and the position information from the recording medium; a storing unit for storing the image information and the position information obtained by the medium control unit; a broadcast receiving unit for receiving a broadcast signal; a broadcast signal analyzing unit for receiving the signal from the broadcast receiving unit and outputting at least a video signal, a sound signal, and additional information including program-related position information; a display unit; and a control unit. The control unit extracts the program-related position information from the additional information, calculates the degree of recommendation of a program corresponding to the additional information based on the position information stored in the storing unit and the extracted program-related position information, and specifies a recommended program. The display unit displays an image obtained by combining the image information related to the recommended program and an image indicative of the calculated degree of recommendation.

A digital broadcast receiving method includes the steps of: inserting a recording medium on which position information is recorded together with image information; obtaining the image information and the position information from the recording medium; storing the image information and the position information obtained; receiving a broadcast signal and separating the broadcast signal into at least a video signal, a sound signal, and additional information including program-related position information; extracting the program-related position information from the additional information; calculating the degree of recommendation of a program corresponding to the additional information based on the position information and the program-related position information and specifying a recommended program; and combining the image information related to the recommended program and an image indicative of the calculated degree of recommendation and displaying the resultant image.

BRIEF DESCRIPTION OF THE DRAWINGS

FIG. 4 is a diagram showing a configuration of a display image list in the embodiment of the present invention.

FIG. 5 is a diagram showing a configuration of a display image accumulation list in the embodiment of the present invention.

FIG. 6 is a diagram showing a configuration of an electronic program table list in the embodiment of the present invention.

DESCRIPTION OF REFERENCE MARKS

Figure 1:
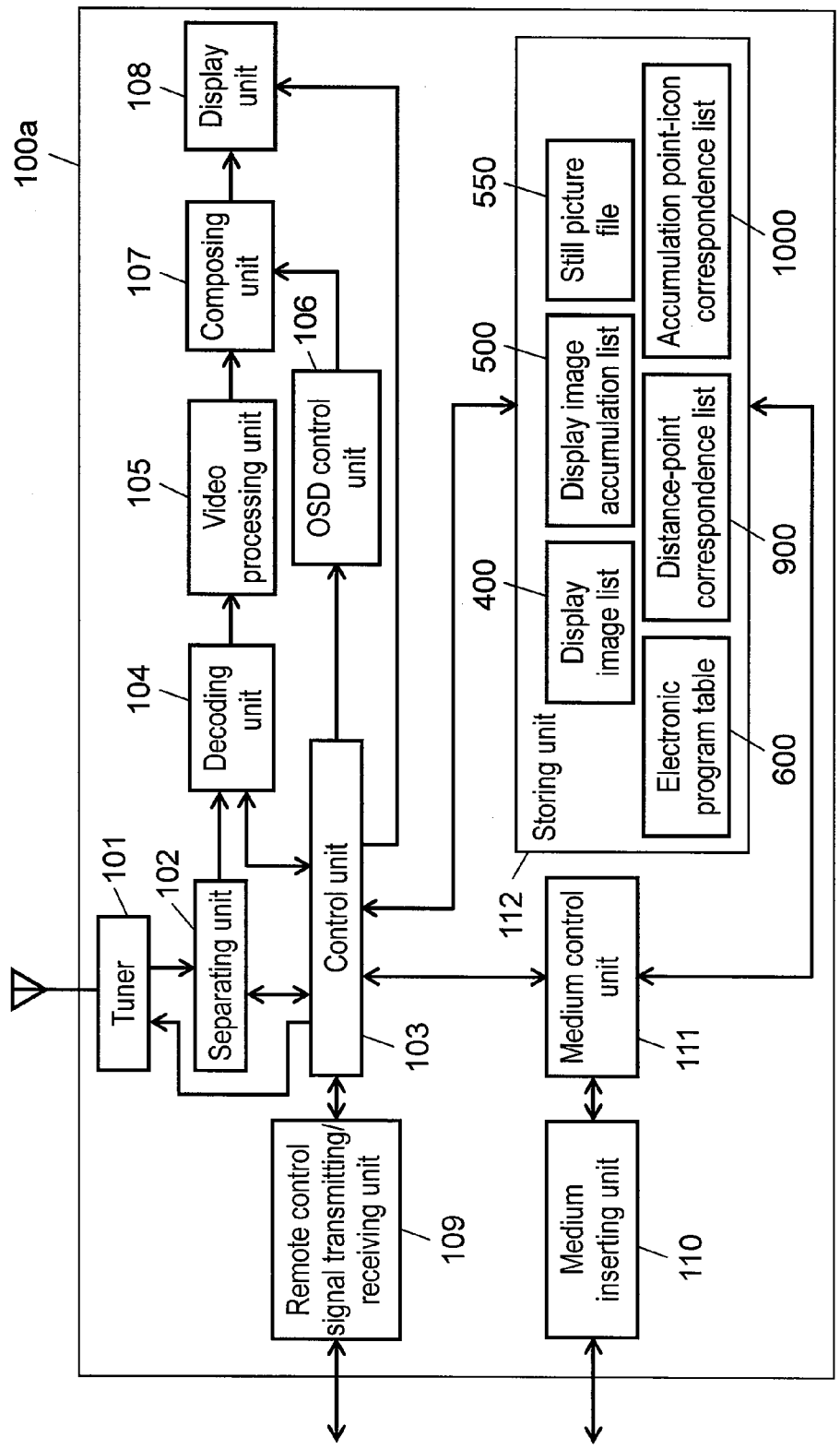
FIG. 1 is a block diagram showing a configuration of a digital broadcast receiving apparatus in an embodiment of the present invention.

100*a*, 100*b* Digital broadcast receiving apparatus
101 Tuner
102 Separating unit
103 Control unit
104 Decoding unit
105 Video processing unit
106 OSD control unit
107 Composing unit
108 Display unit
109 Remote control signal transmitting/receiving unit
110 Medium inserting unit
111 Medium control unit
112 Storing unit
200 Image data
201 Header information
202 Main image additional information
203 Thumbnail additional information
204 Thumbnail image data
205 Main image data
301 Single-image display screen
302 Slide show screen
303 Thumbnail display screen
304 Additional information display screen
305 Thumbnail display frame
400 Display image list
401 Number
402 File name
403 Selection state flag
404 Additional information
405 Pointer to thumbnail image data
406 Pointer to main image data
500 Display image list
501 Number
502 File name
503 Selection state flag
504 Additional information
505 Pointer to thumbnail image data
506 Pointer to main image data
550 Still picture file
600 Electronic program table
601 Event ID
602 Start time
603 Duration of program
604 Program name
605 Program outline
606 Position information (program-related position information)
607 Accumulation point
900 Distance-point correspondence list
901 Point
902 Distance
1000 Accumulation point-icon correspondence list
1001 Accumulation point
1002 Icon
1101, 1102, 1103 Icon indicative of degrees of recommendation
1110 Image
1201 Recording unit Detailed Description of Preferred Embodiments Embodiments of the present invention will be described hereinbelow with reference to the drawings.

(Embodiments)

FIG. 1 is a block diagram showing a configuration of digital broadcast receiving apparatus 100*a* according to the present invention. Digital broadcast receiving apparatus 100*a* is constituted of tuner 101, separating unit 102, control unit 103, decoding unit 104, video processing unit 105, OSD control unit 106, composing unit 107, display unit 108, remote control signal transmitting/receiving unit 109, medium inserting unit 110, medium control unit 111, and storing unit 112. Storing unit 112 stores display image list 400, display image accumulation list 500, still picture file 550, electronic program table 600, distance-point correspondence list 900, and accumulation point-icon correspondence list 1000.

Tuner 101 is an example of a broadcast receiving unit. Tuner 101 receives a digital broadcast signal based on a channel selection request from control unit 103, performs a high-frequency process and a demodulating process on the received digital broadcast signal, and outputs the resultant signal as a transport stream to separating unit 102.

Separating unit 102 is an example of a broadcast signal analyzing unit. Separating unit 102 separates the transport stream from tuner 101 to MPEG data including a digital video signal and a digital sound signal and additional information such as program information, outputs the MPEG data to decoding unit 104, and outputs the additional information to control unit 103.

In a case where a request to select a desired channel is obtained from remote control signal transmitting/receiving unit 109, control unit 103 sends the channel selection request to tuner 101. When viewing a program of the selected channel, control unit 103 outputs program information data necessary for a predetermined operation in the additional information obtained from separating unit 102 to OSD control unit 106. In a case where various requests from remote control signal transmitting/receiving unit 109 or various notifications from medium control unit 111 are obtained, control unit 103 performs a recording medium inserting process and an icon displaying process. The processes will be described in detail later with reference to FIGS. 7 and 8.

In a case where a video process request is obtained from control unit 103, decoding unit 104 decodes the MPEG data from separating unit 102 and outputs the decoded data as a video signal to video processing unit 105. On the other hand, in a case where an image process request is obtained from control unit 103, decoding unit 104 decodes the image data from control unit 103 and outputs the decoded image data as an image signal to video processing unit 105.

Video processing unit 105 performs adjustment of brightness, contrast, and the like on a video signal or image signal from decoding unit 104 and outputs the adjusted signal as video data or image data to composing unit 107.

OSD control unit 106 outputs the program information data from control unit 103 as OSD display data to composing unit 107. In a case where a thumbnail display request is obtained from control unit 103, OSD control unit 106 shapes thumbnail display frame 305 and outputs the OSD display data including thumbnail display frame 305 and identification display data corresponding to a designated position to composing unit 107. The identification display data is data for displaying with emphasis thumbnail display frame 305 in the designated position.

Composing unit 107 composes the video data or image data from video processing unit 105 and OSD display data from OSD control unit 106 and outputs the resultant data as the video signal or image signal to display unit 108.

In the case where the video process request is obtained from control unit 103, display unit 108 displays the video signal from composing unit 107 on the screen. On the other hand, in the case where the image process request from control unit 103 is obtained, display unit 108 displays the image signal from composing unit 107 on the screen. The screen displaying method will be described in detail later with reference to FIG. 4.

Remote control signal transmitting/receiving unit 109 receives a remote control signal from a remote controller (not shown) and outputs the signal as a remote control reception signal to control unit 103.

Medium inserting unit 110 is an inserting unit for inserting a recording medium such as an SD card. A method of recording image data to a recording medium will be described in detail later with reference to FIG. 2.

Medium control unit 111 detects insertion/ejection of a recording medium to/from medium inserting unit 110 and sends various notifications to control unit 103. Medium control unit 111 generates display image list 400, display image accumulation list 500, and still picture file 550 based on a request from control unit 103.

Storing unit 112 stores display image list 400, display image accumulation list 500, and still picture file 550 from medium control unit 111, and electronic program table 600 from control unit 103.

Figure 2:
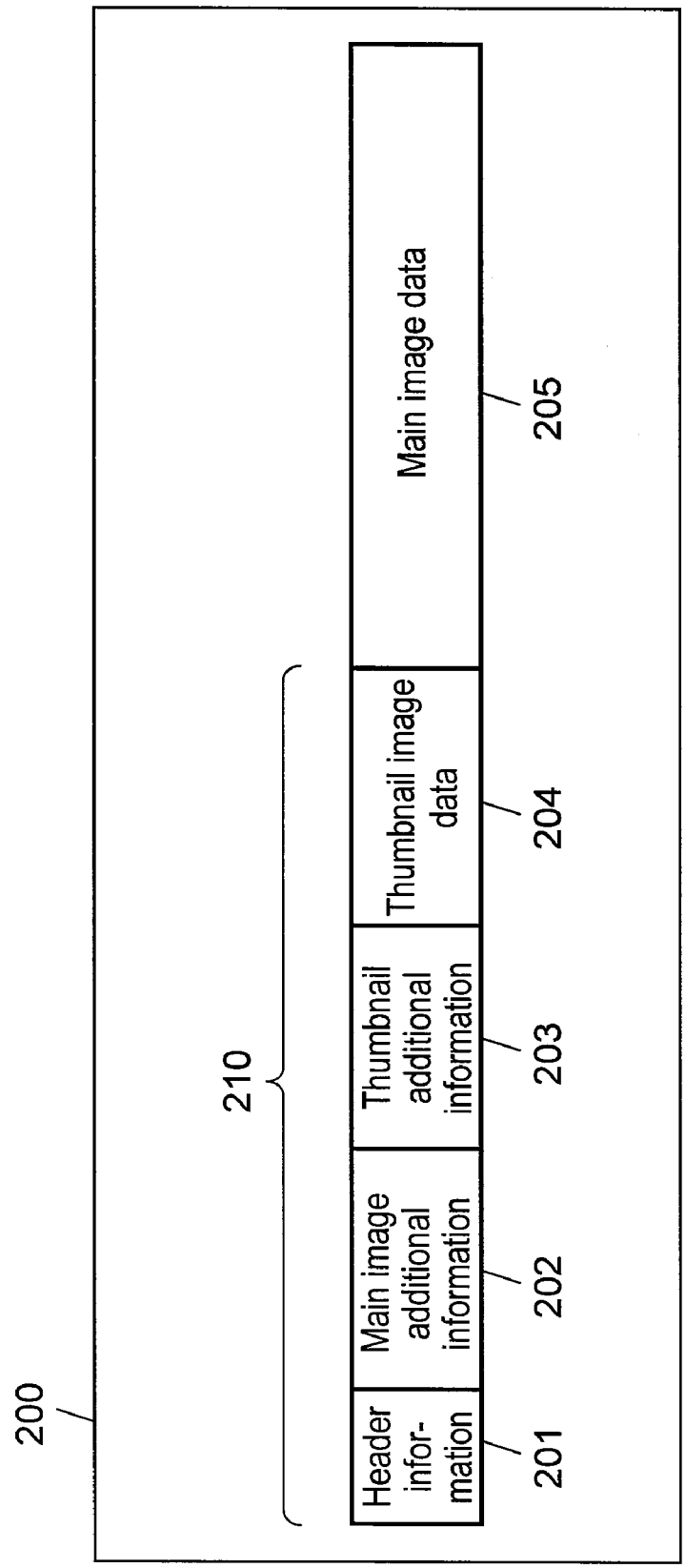
FIG. 2 is a diagram showing a data structure of image data recorded on a recording medium in the embodiment of the present invention.

The method of recording image data onto a recording medium will be described with reference to FIG. 2. Image data 200 recorded on a recording medium is recorded by a digital still camera based on the image file format standard (Exit for digital still cameras. An image to be recorded as main data will be called a "main image" and a small image as an index of the "main image" will be called a "thumbnail". Image data 200 is constituted of header information 201, main image data 205, main image additional information 202, thumbnail image data 204, and thumbnail additional information 203. In header information 201, a file format or data format indicative of the Exif format or JFIF format, a byte order indicative of big endian or little endian, and the like are described. Main image additional information 202 includes additional information regarding main image data 205 such as resolution of an image, compression type, and pixel configuration, information regarding image capturing parameters such as date and time of image capture, subject distance, and shutter speed, and information regarding GPS such as longitude, latitude, and altitude. EXIF data portion (APP1) 210 is constituted of header information 201, main image additional information 202, thumbnail image data 204, and thumbnail additional information 203.

In the present embodiment, it is described that image data 200 recorded on a recording medium is recorded by a digital still camera based on "Exif" as the image file format standard for digital still cameras. However, the image file format standard for digital still cameras of image data 200 recorded on a recording medium is not necessarily based on "Exif". Image data 200 recorded on a recording medium may be based on a standard other than "Exif".

The image displaying method will be described with reference to FIG. 3. Screen display includes single-image display 301, slide show display 302, thumbnail display 303, and additional information display 304. In single-image display 301, main image data 205 of one image and image additional information 202 are displayed simultaneously. In slide show display 302, main image data 205 is continuously displayed on entire display unit 108. In thumbnail display 303, sorting by file names is performed, and then thumbnail image data 204 is displayed in layout of 3×3 or the like. In additional information display 304, only main image additional information 202 in main image data 205 is displayed in text. In thumbnail display 303, a thumbnail selected with thumbnail display frame 305 shaped by OSD control unit 106 is displayed by being emphasized with a frame or the like. In slide show display 302, after predetermined time elapses in order of a display image list, a main image being selected is switched to next main image.

Medium control unit 111 generates display image list 400, display image accumulation list 500, and still picture file 550 by using information in image data 200.

The configuration of display image list 400 will be described with reference to FIG. 4. Display image list 400 is a list of image data stored in a recording medium and is constituted of number 401, file name 402, selection state flag 403, additional information 404, pointer 405 to thumbnail image data 204, and pointer 406 to main image data 205. Number 401 is a serial number for sorting. Selection state flag 403 indicates whether an image is being selected or not. As additional information 404, position information of a GPS and information regarding image capturing such as Exif is written.

The configuration of display image accumulation list 500 will be described with reference to FIG. 5. Display image accumulation list 500 is a list of all of image data stored in digital broadcast receiving apparatus 100a and has the same structure as that of display image list 400. Display image accumulation list 500 is constituted of number 501, file name 502, selection state flag 503, additional information 504, pointer 505 to thumbnail image data 204, and pointer 506 to main image data 205. Number 501 is a serial number for sorting. Selection state flag 503 indicates whether an image is being selected or not. As additional information 504, position information of a GPS and information regarding image capturing such as Exif is written. The pointer to image data 200 is a pointer to still picture file 550 stored in storing unit 112 in digital broadcast receiving unit 100a.

Electronic program table 600 will be described with reference to FIG. 6. Electronic program table 600 is a mechanism of transmitting program data by using broadcast waves and displaying it by a receiver.

In digital broadcast, information of data packets including information called SI (Service Information, program sequence information) is accumulated, and an electronic program table is presented.

In an EIT (Event Information Table) in SI, information regarding each of programs such as program name, broadcast date and time, outline of the program, and the like is written as event information. On a receiver side, information of the received EIT is accumulated and is presented like a "radio and TV listings" in newspaper. In the present invention, as the event information of the EIT, position information such as latitude, longitude, and altitude (program related position information) is added.

Digital broadcast receiving apparatus 100a stores the received EIT, like in electronic program table 600, event ID 601, start time 602, duration time 603 of the program, program name 604, program outline 605, position information (program-related position information) 606, and accumulation point 607. Positional information (program-related position information) 606 includes latitude, longitude, and altitude.

Figure 7:
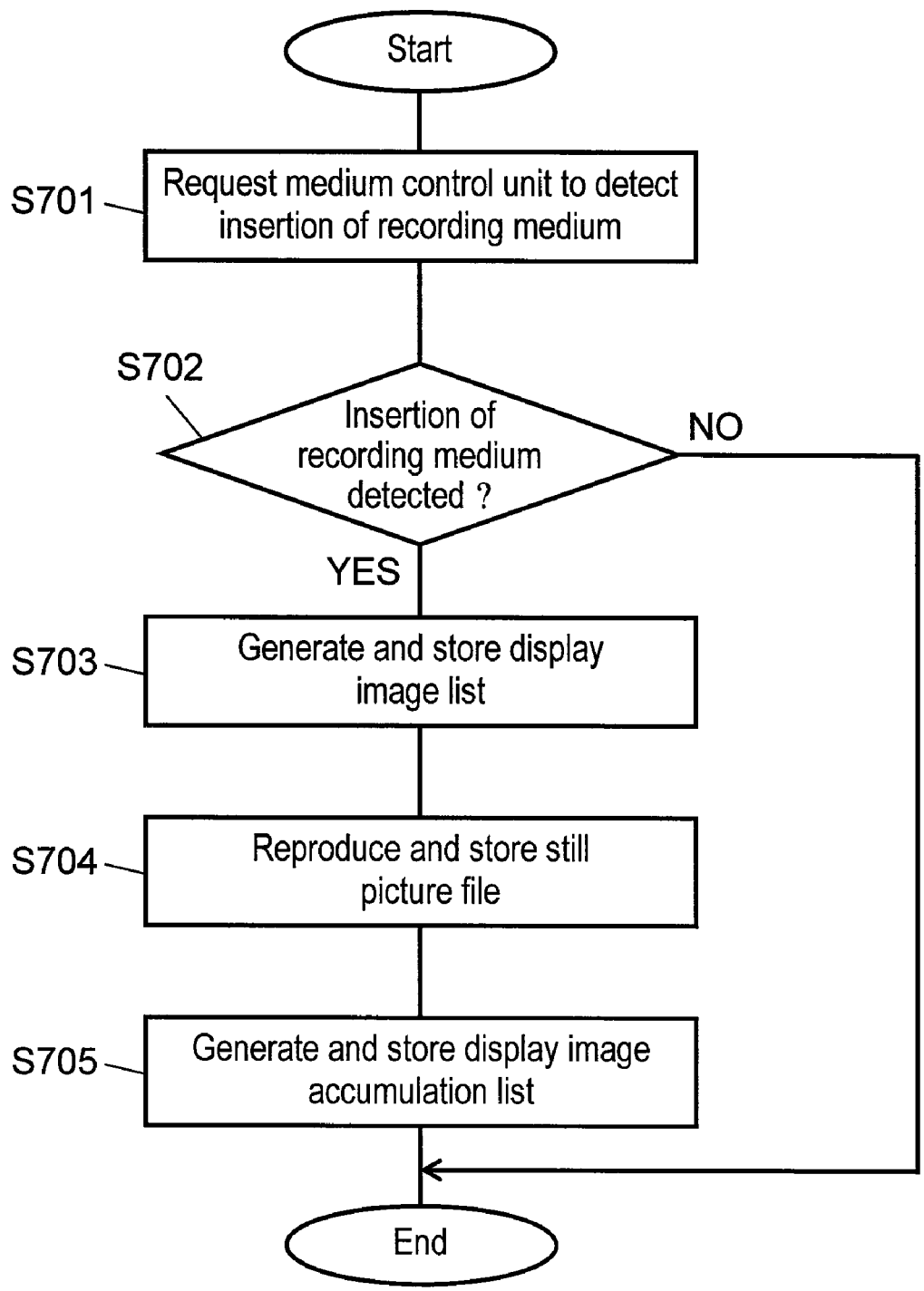
FIG. 7 is a flowchart showing processes performed when a recording medium is inserted in the digital broadcast receiving apparatus by the digital broadcast receiving method in the embodiment of the present invention.

A recording medium inserting process using the digital broadcast receiving apparatus 100a will be described below using the flowchart of FIG. 7.

Control unit 103 of digital broadcast receiving apparatus 100a requests the medium control unit 111 to periodically monitor insertion/ejection of a recording medium to/from medium inserting unit 110 (step S701).

In a case where medium control unit 111 detects insertion of a recording medium ("YES" in step S702), control unit 103 is notified of insertion of a recording medium. In a case where medium control unit 111 does not detect insertion of a recording medium ("NO" in step S702), the recording medium inserting process using digital broadcast receiving apparatus 100a is completed.

Figure 3:
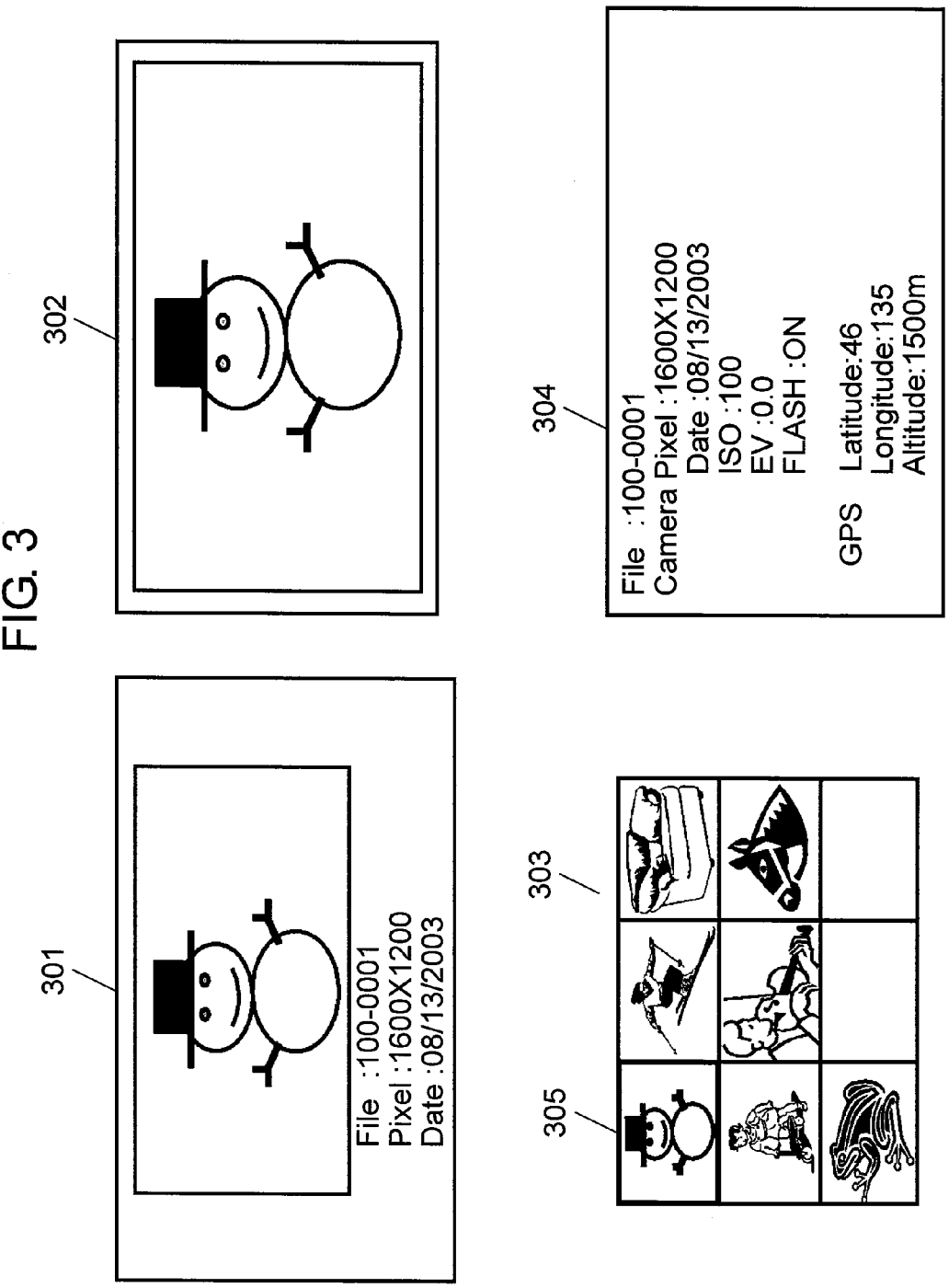
FIG. 3 is a diagram showing an example of a method of displaying image data recorded on the recording medium in the embodiment of the present invention.

When the recording medium insertion notification is received, for medium control unit 111, control unit 103 reads an image file in the recording medium, extracts necessary information from the file structure of the Exif format shown in FIG. 3, and generates and stores display image list 400 (step S703).

After generation of display image list 400, a still picture file is generated and stored in storing unit 112 in digital broadcast receiving apparatus 100a (step S704). The image size of a still picture file may be resized to a smaller size in order to efficiently use the capacity of storing unit 112.

Display image list 400 is then coupled to the end of display image accumulation list 500. In this case, information of display image accumulation list 500 is compared with an image of display image list 400 which is added this time. In a case where the data is already stored, the data is not added. The pointer of the still picture file is switched to the pointer of still picture file 550 stored in storing unit 112 and stored (step S705). The recording medium inserting process using digital broadcast receiving apparatus 100a is completed.

Figure 8:
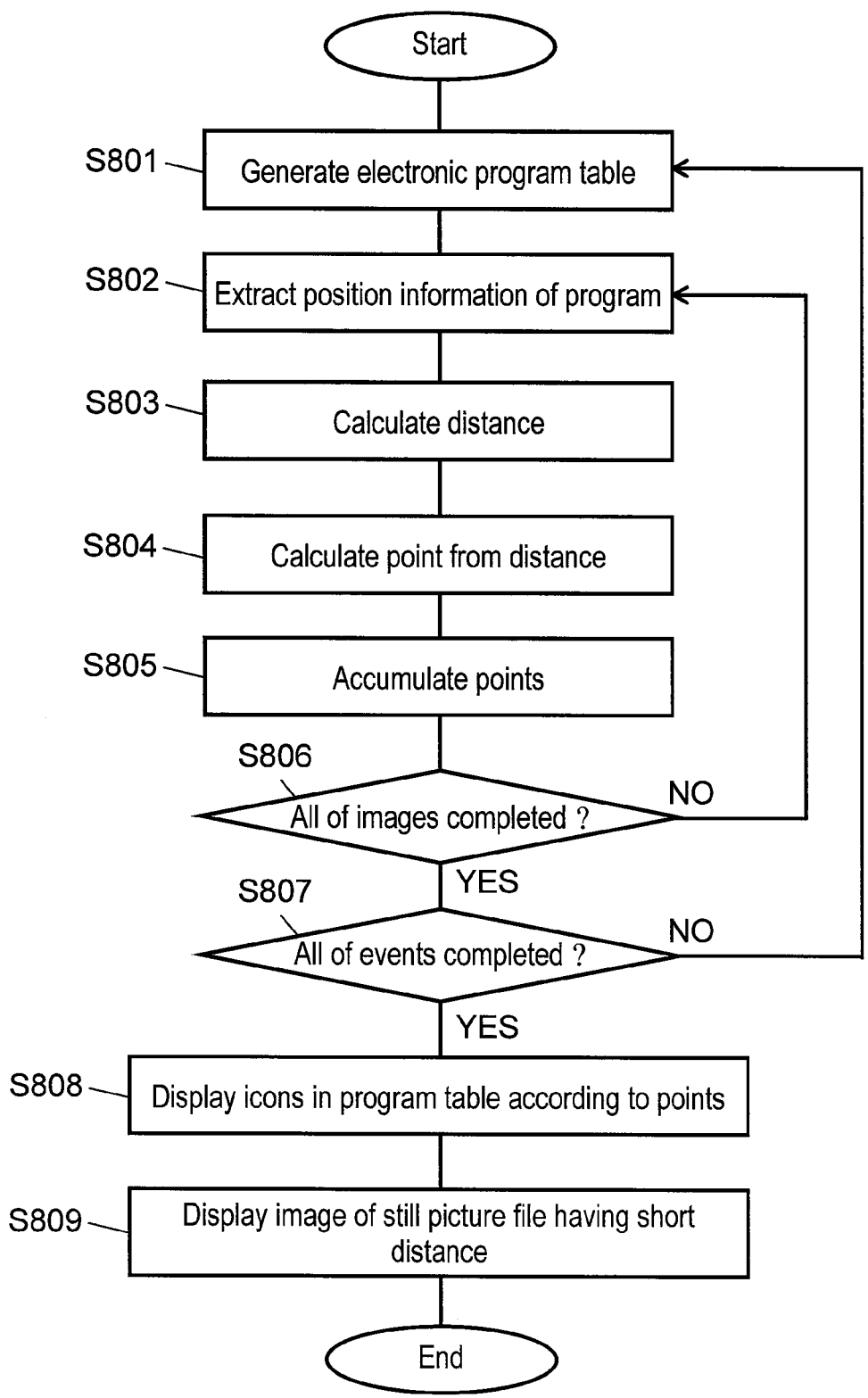
FIG. 8 is a flowchart showing processes when the electronic program table list is generated by the digital broadcast receiving apparatus and the digital broadcast receiving method in the embodiment of the present invention.

With reference to FIG. 8, a process of displaying an icon indicating that a program relates to a favorite place of the user, where the user frequently visits will be described. Control unit 103 of digital broadcast receiving apparatus 100a receives the EIT and generates electronic program table 600 (step S801).

The position information of the program written in electronic program table 600 is extracted (step S802). A distance is calculated from the latitude, longitude, and altitude of the position information of each of still picture files corresponding to serial numbers 501 in display image accumulation list 500 of storing unit 112 (step S803). For calculation of the distance, it is sufficient to use a known method for calculating a distance from the latitude, longitude, and altitude such as a formula of Hubeny.

Figure 9:
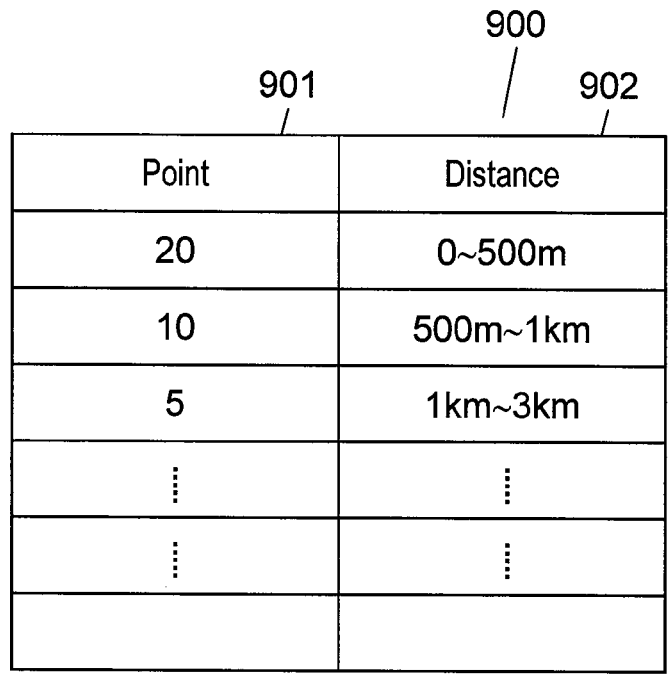
FIG. 9 is a diagram showing an example of a table for calculating a point from a distance by the digital broadcast receiving apparatus and the digital broadcast receiving method in the embodiment of the present invention.

Control unit 103 calculates a point from still picture file 550 and the distance of program information based on distance-point correspondence list 900 shown in FIG. 9 (step S804).

Points calculated in step S804 are accumulated program by program, and are written in the box of accumulation point 607 in electronic program table 600 (step S805).

Until points of all of images in display image accumulation list 500 are accumulated ("YES" in step S806), the processes from step S803 to step S805 are repeated ("NO" in step S806).

Until points of the program corresponding to all of event IDs 601 in electronic program table 600 are accumulated ("YES" in step S807), the processes from step S802 to step S806 are repeated ("NO" in step S807).

After completion of calculation of the accumulated total point of all of the programs, the icon according to the accumulated total point is specified from accumulation point-icon correspondence list 1000 and presented on the column of the corresponding program in the program table (step S808).

The method of displaying an icon onto a program table is not limited to the above. Another shape of an icon or the number of points may be displayed.

Display of a thumbnail or the like of a still picture file having the distance close to the latitude and longitude written in electronic program table 600 (step S809) allows the user to understand the place of the program more easily.

FIG. 9 shows distance-point correspondence list 900 indicative of the relation between point 901 and distance 902. Distance 902 is calculated from latitude, longitude, and altitude of position information of each of the still picture files accumulated in storing unit 112 (step S803). For example, when calculated distance 902 lies in the range of "0 to 500 m", point 901 is "20". When calculated distance 902 lies in the range of "500 to 1 km", point 901 is "10".

Figure 10:
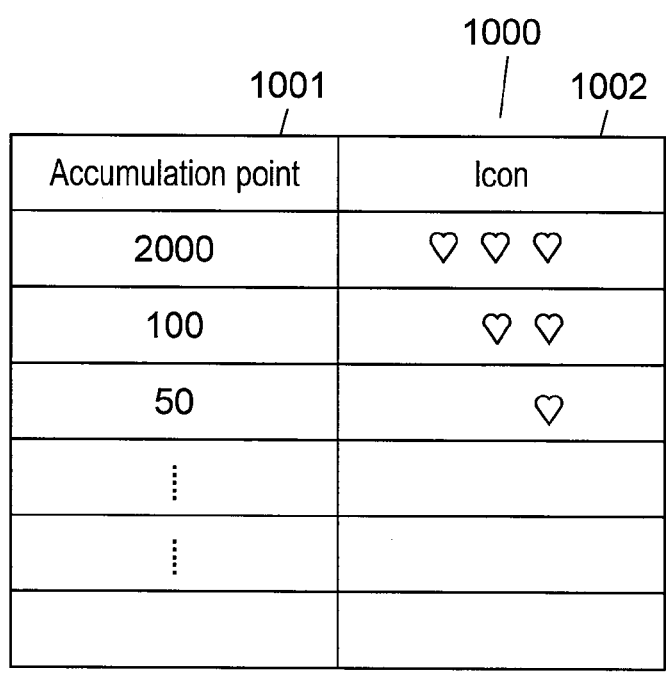
FIG. 10 is a diagram showing an example of a table for specifying an icon from an accumulation point by the digital broadcast receiving apparatus and the digital broadcast receiving method in the embodiment of the present invention.

FIG. 10 shows accumulation point-icon correspondence list 1000 indicative of the relation between accumulation point 1001 and icon 1002. Accumulation point 1001 is accumulation point calculated in step S807 and shows the degree of recommendation. In icon 1002, display examples of icons corresponding to the calculated accumulation points are shown.

Figure 11:
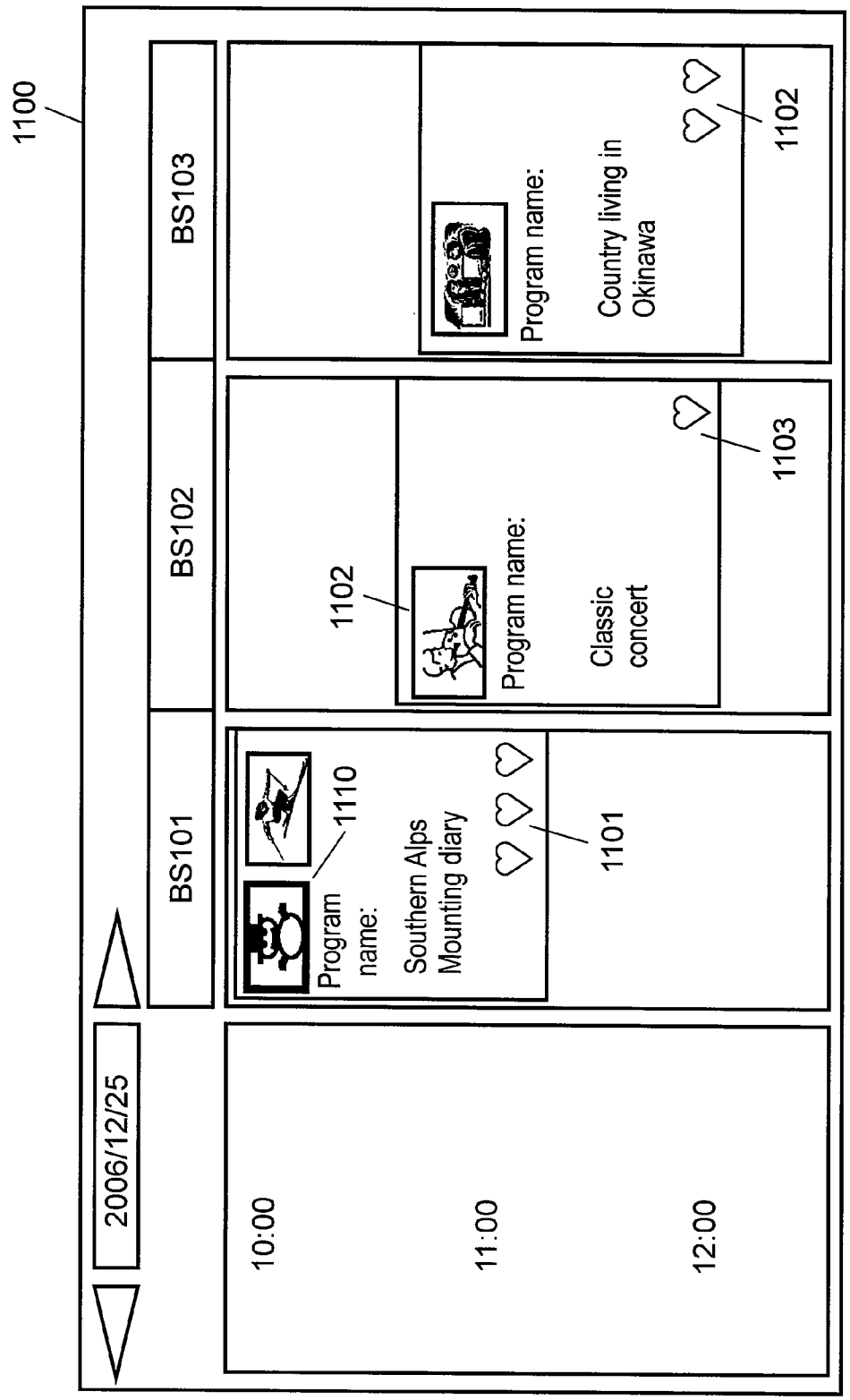
FIG. 11 is a diagram showing an example of an electronic program table in the digital broadcast receiving apparatus and the digital broadcast receiving method in the embodiment of the present invention.

FIG. 11 shows an example of electronic program table 1100 presented by digital broadcast receiving apparatus 100a. Icons 1101, 1102, and 1103 indicative of the degrees of recommendation show the degrees of recommendation determined in step S808 in columns of corresponding programs in electronic program table 1100. In the column of image 1110, image 1110 of the still picture file captured in a place having a distance close to the latitude and longitude of the program is displayed.

Figure 12:
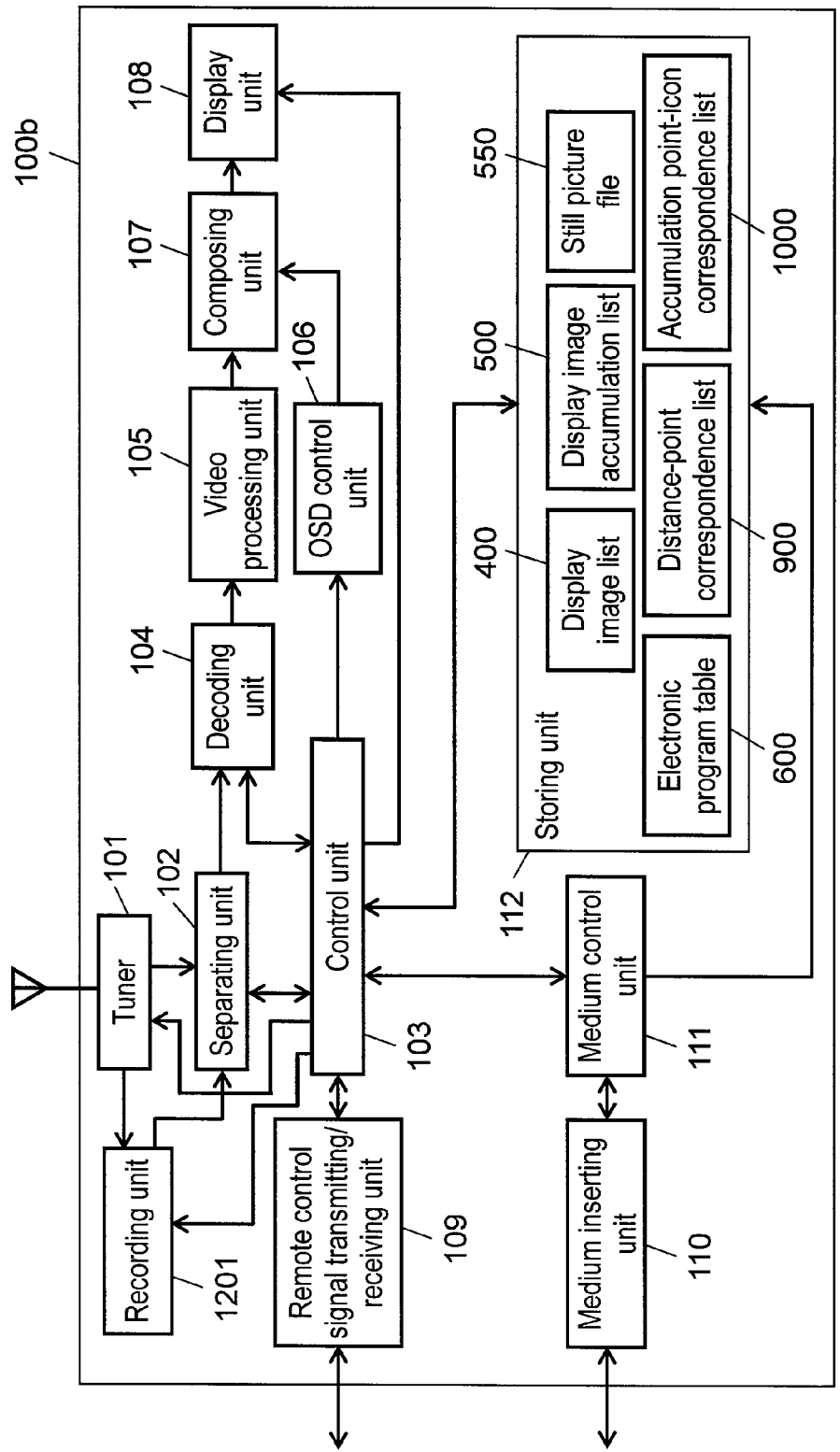
FIG. 12 is a block diagram showing another configuration of a digital broadcast receiving apparatus in the embodiment of the present invention.

Another configuration of the digital broadcast receiving apparatus in the embodiment of the present invention will be described with reference to FIG. 12. FIG. 12 is a block diagram showing another configuration of the digital broadcast receiving apparatus in the embodiment of the present invention. The different point of digital broadcast receiving apparatus 100b shown in FIG. 12 from digital broadcast receiving apparatus 100a shown in FIG. 1 is recording unit 1201. In FIG. 12, the same reference numerals as those of FIG. 1 are the same components as those of FIG. 1. Therefore, recording unit 1201 will be mainly described, and the description of the other components will not be repeated.

Tuner 101 supplies its output to separating unit 102 and recording unit 1201. Recording unit 1201 is controlled by control unit 103 to record the signal from tuner 101. Control unit 103 controls so that recording unit 1201 also records a recommended program. With the configuration of FIG. 12, recording unit 121 can record not only the signal from tuner 101 but also the recommended program. Under control of control unit 103, the signal recorded in recording unit 1201 is reproduced as necessary, and the reproduced signal is supplied to separating unit 102.

In the embodiment, the mode of displaying icons 1101, 1102, and 1103 indicative of the degrees of recommendation in electronic program table 1100 has been described. However, the invention is not limited to the mode. For example, when the user sequentially changes channels to select a program, icons 1101, 1102, and 1103 indicative of the degrees of recommendation may be displayed together with program names for predetermined time after the change of the channel.

Control unit 103 shown in FIGS. 1 and 12 can realize such functions in cooperation with remote control signal transmitting/receiving unit 109, storing unit 112, OSD control unit 106, and the like.

In a case where another program having high distance point exists besides a program being viewed, the another program may be recommended by displaying a message on an OSD (On-Screen Display) in the program being viewed, or notifying of a voice message. Control unit 103 shown in FIGS. 1 and 12 can also realize such a function in cooperation with storing unit 112, OSD control unit 106, and the like.

Further, in a case of digital broadcast receiving apparatus 100*a* having the recording function, a program having a certain point or higher may be automatically recorded. Control unit 103 shown in FIG. 12 can also realize such a function in cooperation with storing unit 112, recording unit 1201, and the like.

An example of electronic program table 1100 in digital broadcast receiving apparatuses 100*a* and 100*b* in the embodiment of the present invention has been described with reference to FIG. 11. In electronic program table 1100 of the present invention, however, it is sufficient to display at least icons 1101, 1102, and 1103 indicative of the degrees of recommendation. That is, at least a part of the configuration other than icons 1101, 1102, and 1103 indicative of the degrees of recommendation may not be shown.

Icons 1101, 1102, and 1103 indicative of the degrees of recommendation can also be displayed in a channel banner. Control unit 103 shown in FIGS. 1 and 12 can also realize such a function in cooperation with storing unit 112, OSD control unit 106, and the like.

As described above, the present invention can provide a program related to a favorite place of the user by estimating a favorite place of the user by using GPS information included in still pictures on a recording medium and comparing the place with position information included in EPG information in a digital broadcast signal.

That is, the place where the user frequently visits is determined from position information of a digital camera, and a program suited to the taste of the user can be presented.

Industrial Applicability

In the digital broadcast receiving apparatus and the digital broadcast receiving method, position information of an image captured by a digital still camera on which a GPS is mounted is stored. The position information is compared with position information of a program. A program related to a position having high visiting frequency of the user can be recommended. The present invention can be effectively applied to various digital broadcast receiving apparatuses and digital broadcast receiving methods of BS/CS broadcasting, digital terrestrial broadcasting, CATV, and the like.

The invention claimed is:

1. A digital broadcast receiving apparatus comprising:
   a storing unit for storing image information and position information for at least one image obtained from a recording medium;
   a broadcast receiving unit for receiving a broadcast signal, the broadcast signal including program information and additional information, the additional information including position information for at least one program;
   a display unit; and
   a control unit,
   wherein the control unit:
   calculates a distance between the position information for the at least one image and the position information for the at least one program , and
   controls the display unit to display the at least one image and an image indicating the distance between the position information of the at least one image and the position information of the at least one program with the program information of the at least one program if the distance is less than a threshold.

2. The digital broadcast receiving apparatus according to claim 1, wherein the control unit further generates electronic program table information using the additional information,
   the display unit further displays an image related to the electronic program table information, and
   the control unit presents an image obtained by combining the image information related to the at least one program and an image indicative of the degree of recommendation in an image related to the electronic program table information.

3. The digital broadcast receiving apparatus according to claim 1, further comprising:
   a recording unit for recording a signal from the broadcast receiving unit,
   wherein the control unit controls so that the recording unit also records the program.

4. The digital broadcast receiving apparatus according to claim 2, further comprising:
   a recording unit for recording a signal from the broadcast receiving unit,
   wherein the control unit controls so that the recording unit also records the program.

5. The digital broadcast receiving apparatus according to claim 1,
   wherein the distance is calculated from latitude, longitude, and altitude of the position information.

6. A digital broadcast receiving method comprising:
   obtaining image information and position information for an image from a recording medium;
   storing the image information and the position information obtained;
   receiving a broadcast signal program and separating the broadcast signal program into at least a video signal, a sound signal, and additional information, the additional information including program-related position information for the program;
   extracting the program-related position information from the additional information;
   calculating a distance between the position information for the image and the program related position information for the program;
   combining the image and a recommendation image with the program information of the program if the distance is less than a threshold, the recommendation image indicating the distance between the position information of the image and the position information of the program.

7. The digital broadcast receiving method according to claim 6, further comprising:
   generating electronic program table information using the additional information and storing it;
   displaying an image related to the electronic program table information; and
   presenting an image obtained by combining the image information related to the program and an image indicative of the degree of recommendation into an image related to the electronic program table information.

8. The digital broadcast receiving method according to claim 6, further comprising:
   recording the received signal; and
   recording the program as well.

9. The digital broadcast receiving method according to claim 7, further comprising:
   recording the received signal; and
   recording the program as well.

10. The digital broadcast receiving method according to claim 6, further comprising:
    calculating the distance from latitude, longitude, and altitude of the position information.

* * * * *

UNITED STATES PATENT AND TRADEMARK OFFICE
CERTIFICATE OF CORRECTION

| | |
|---|---|
| PATENT NO. | : 8,249,430 B2 |
| APPLICATION NO. | : 12/298395 |
| DATED | : August 21, 2012 |
| INVENTOR(S) | : Takeshi Hayakawa |

It is certified that error appears in the above-identified patent and that said Letters Patent is hereby corrected as shown below:

On the Cover Page, item [56], References Cited, FOREIGN PATENT DOCUMENTS:

Delete the following duplicate references:

"JP    2001223960A    8/2001
JP    2004062428A    2/2004
JP    2006-238192A   9/2006"

Signed and Sealed this
Twenty-second Day of January, 2013

David J. Kappos
*Director of the United States Patent and Trademark Office*